United States Patent
Bielicki et al.

(10) Patent No.: US 6,899,081 B2
(45) Date of Patent: May 31, 2005

(54) FLOW CONDITIONING DEVICE

(75) Inventors: Jim Bielicki, Livonia, MI (US); Reza Abdolhosseini, West Bloomfield, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/251,582

(22) Filed: Sep. 20, 2002

(65) Prior Publication Data

US 2004/0055570 A1 Mar. 25, 2004

(51) Int. Cl.$^7$ .................................................. F02D 9/00
(52) U.S. Cl. ............. 123/402; 123/184.22; 123/198 E; 123/184.61; 73/118.2
(58) Field of Search ...................... 123/184.22, 184.23, 123/184.32, 184.54, 184.61, 198 E, 402; 73/118.2

(56) References Cited

U.S. PATENT DOCUMENTS

| | | | |
|---|---|---|---|
| 2,332,694 A | 10/1943 | Campbell | |
| 2,870,779 A | * 1/1959 | Thommiszer | 137/219 |
| 3,314,290 A | 4/1967 | Peranio | |
| 3,998,614 A | 12/1976 | Schonberger et al. | 55/417 |
| 4,280,360 A | 7/1981 | Kobayashi et al. | 73/198 |
| 4,365,518 A | 12/1982 | Zacharias, Jr. | 73/861.31 |
| 4,434,778 A | * 3/1984 | Morita et al. | 123/587 |
| 4,457,169 A | 7/1984 | Lauterbach et al. | 73/202 |
| 4,517,837 A | 5/1985 | Oyama et al. | 73/202 |
| 4,790,864 A | * 12/1988 | Kostun | 96/388 |
| 4,879,898 A | 11/1989 | Bamer | 73/118.2 |
| 5,029,465 A | 7/1991 | Tanimura et al. | 73/118.2 |
| 5,179,858 A | 1/1993 | Atwood | 73/118.2 |
| 5,209,113 A | 5/1993 | Sawada et al. | 73/202.5 |
| 5,355,726 A | 10/1994 | Zurek et al. | 73/202.5 |
| 5,398,548 A | 3/1995 | Ono | 73/202 |
| 5,476,012 A | 12/1995 | Takashima | 73/861.34 |
| 5,894,088 A | 4/1999 | Sawada et al. | 73/204.19 |
| 6,003,490 A | 12/1999 | Kihara et al. | 123/337 |
| 6,018,994 A | 2/2000 | Yonezawa et al. | 73/202.5 |
| 6,067,958 A | 5/2000 | Kamimura et al. | 123/337 |
| 6,079,264 A | 6/2000 | Yamakawa et al. | 73/206.26 |
| 6,173,939 B1 | 1/2001 | Dottavio et al. | 251/129.12 |
| 6,272,920 B1 | 8/2001 | Tank et al. | 73/204.22 |
| 6,394,062 B2 | * 5/2002 | Daly et al. | 123/198 E |
| 6,408,811 B1 | * 6/2002 | Glovatsky et al. | 123/184.61 |
| 2002/0104490 A1 | 8/2002 | Itakura et al. | 123/41.31 |
| 2002/0104990 A1 | 8/2002 | DeReus et al. | 257/20 |

FOREIGN PATENT DOCUMENTS

| | | |
|---|---|---|
| EP | 0531 858 A1 | 9/1991 |
| EP | 0 909 890 A3 | 3/2000 |
| EP | 1 170 487 A2 | 1/2002 |
| GB | 2 328 514 A | 2/1999 |
| JP | 58111720 | 12/1981 |
| JP | 2001289132 A | 4/2000 |
| WO | WO 99/61776 | 1/1999 |

* cited by examiner

*Primary Examiner*—Tony M. Argenbright
*Assistant Examiner*—Johnny H. Hoang
(74) *Attorney, Agent, or Firm*—Brinks Hofer Gilson & Lione (57) ABSTRACT

The present invention is generally directed towards an air induction system in a motor vehicle. The air induction system comprises an air filter, a clean air duct, a mass air flow sensor housing duct, a mass air flow sensor and a flow conditioning device. The flow conditioning device is disposed inside a mass air flow sensor housing duct. The flow conditioning device is located upstream from the mass air flow sensor. The air flowing through the clean air duct encounters turbulence near the walls of the duct. The flow conditioning device prevents the turbulent air from flowing into the mass air flow sensor.

26 Claims, 7 Drawing Sheets

FIGURE - 4
SECTION A-A

FIGURE - 5
SECTION A-A

FLOW CONDITIONING DEVICE

TECHNICAL FIELD

This invention generally relates to an air induction system in the engine of an automobile. More specifically to a flow conditioning device installed in the air induction system.

BACKGROUND

Internal combustion engines today include electronic controls to provide optimal engine operation. One critically important sensor for achieving optimal engine control is a mass air flow sensor for measuring air intake into the internal combustion engine.

It is critical that the mass air flow measurement is accurate in order to provide optimal engine operation. One significant problem affecting the mass air flow measurement is the turbulence in the air flow that could result in high noise-to-signal output. Prior art flow conditioning devices have attempted to address this problem by providing devices that reduce the turbulence of the entire flow field. Typically, the prior art devices use either a grid or a screen. While prior art devices such as one discussed, reduce the turbulence of the entire flow field, they are susceptible to freezing and therefore cutting off air flow to the engine. Additionally, these devices are costly to manufacture.

Therefore, there is a need in the automotive industry to improve the design of the flow conditioning devices that deliver low turbulent flow field to the mass air flow sensor.

SUMMARY

In one aspect of the present invention, an air induction system installed in a motor vehicle is provided. The air induction system comprises an air filter, a clean air duct, a mass air flow sensor, a mass air flow sensor housing duct and flow conditioning device.

In yet another aspect of the present invention, a flow conditioning device is disposed at the center of the mass air flow sensor housing duct. The flow conditioning device is located upstream from the mass air flow sensor and downstream from the air filter in the air flow path. The flow conditioning device has an inlet for intaking the air from the clean air duct and an outlet for the air to exit to the mass air flow sensor.

In yet another aspect of the present invention, the entrance of the mass air flow sensor is positioned near the outlet of the flow conditioning device. therefore the air exiting the flow conditioning device enters the mass air flow sensor entrance. The turbulent flow near the wall of the mass air flow sensor housing duct bypasses the flow conditioning device and the entrance of the mass air flow sensor.

In yet another aspect of the present invention, the outlet of the flow conditioning device is provided with a constant area section such that the air flow to the entrance of the mass air flow sensor is substantially at a zero angle.

Further features and advantages of the invention will become apparent from the following discussion and the accompanying drawings in which:

DETAILED DESCRIPTION

The following description of the preferred embodiment is merely exemplary in nature and is in no way intended to limit the invention or its application or uses.

Figure 1:
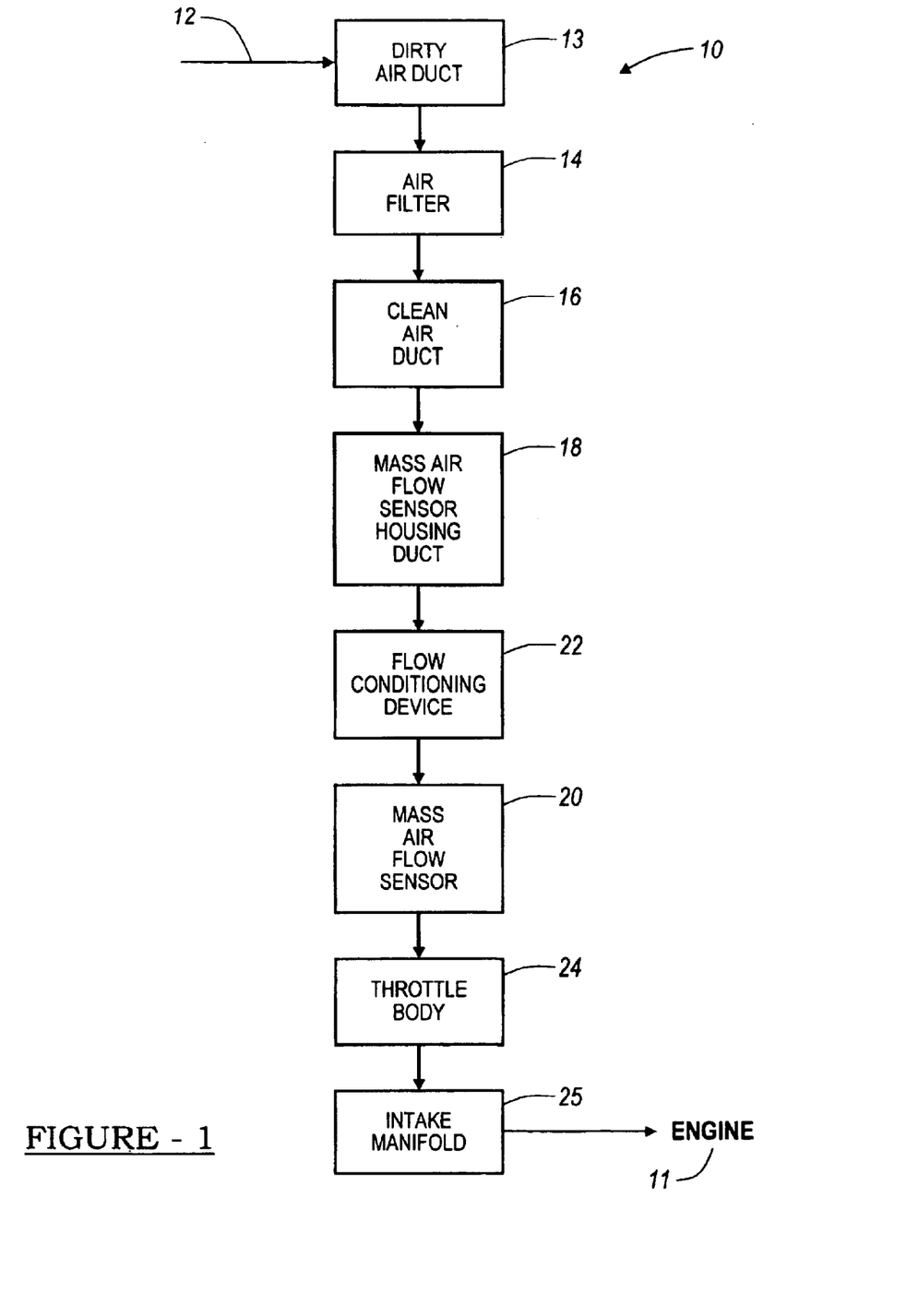
FIG. 1 is a block representation of the various components of an air induction system in accordance with the teachings of the present invention.

Referring in particular to FIG. 1, an air induction system installed in the vicinity of an engine 11 in an automobile is generally shown and represented by reference numeral 10. The air induction system 10, functions to filter and meter the air intake flow from the outside into the engine 11. The direction of the air flow from the outside to the engine is shown by reference numeral 12.

The air induction system 10 comprises a dirty air duct 13, an air filter 14, a clean air duct 16, a mass air flow sensor (MAFS) housing duct 18, a mass air flow sensor (MAFS) 20 and a flow conditioning device 22. The air induction system 10 also comprises a throttle body 24 connected to the MAFS housing 18. The drawings the throttle body 24 is typically connected to an intake manifold 25. The intake manifold 25 is connected to the engine 11. The throttle body 24 used in the present invention is well known in the art and therefore is not explained in details.

The air filter 14 functions to filter the air drawn or inducted from the outside before it is delivered to the engine 11. The air filter 14 used in the present invention is well known in the art and therefore not explained in detail. The air filter 14 is connected to the clean air duct 16 such that the air after being filtered by the air filter 14 flows to the clean air duct 16.

Figure 2:
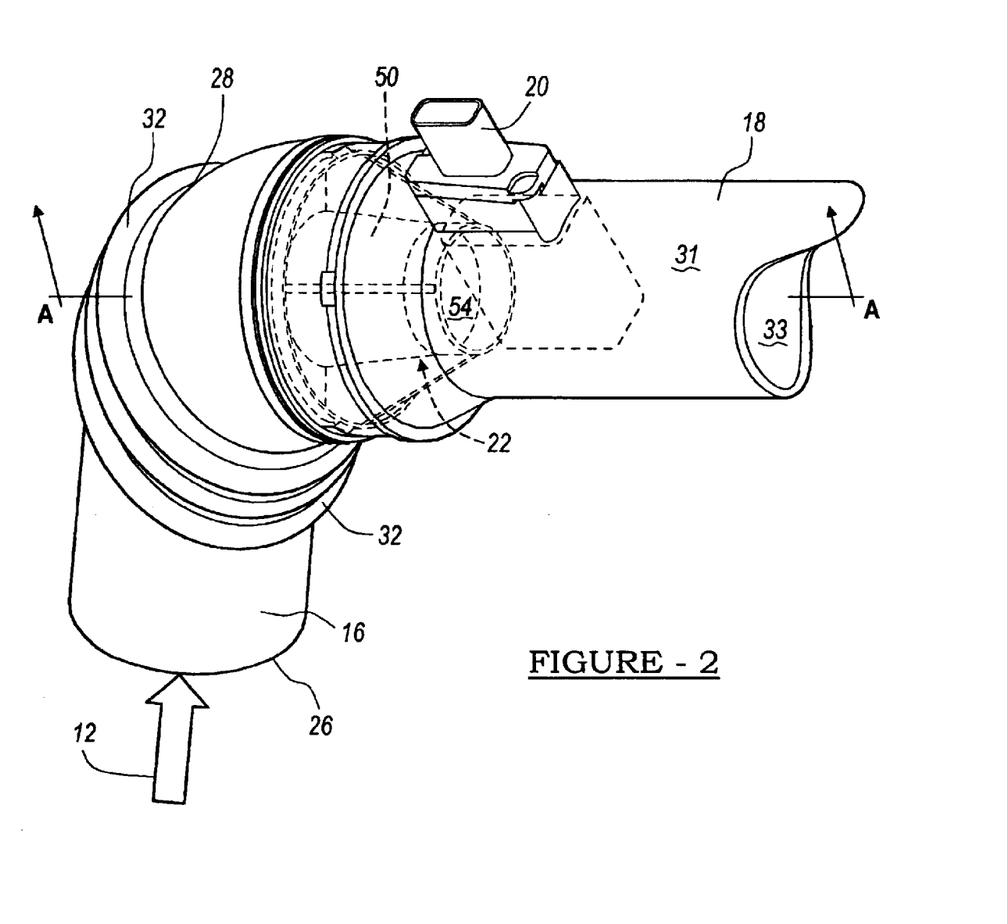
FIG. 2 is a perspective view of the air induction system in accordance with the teachings of the present invention.
Figure 3:
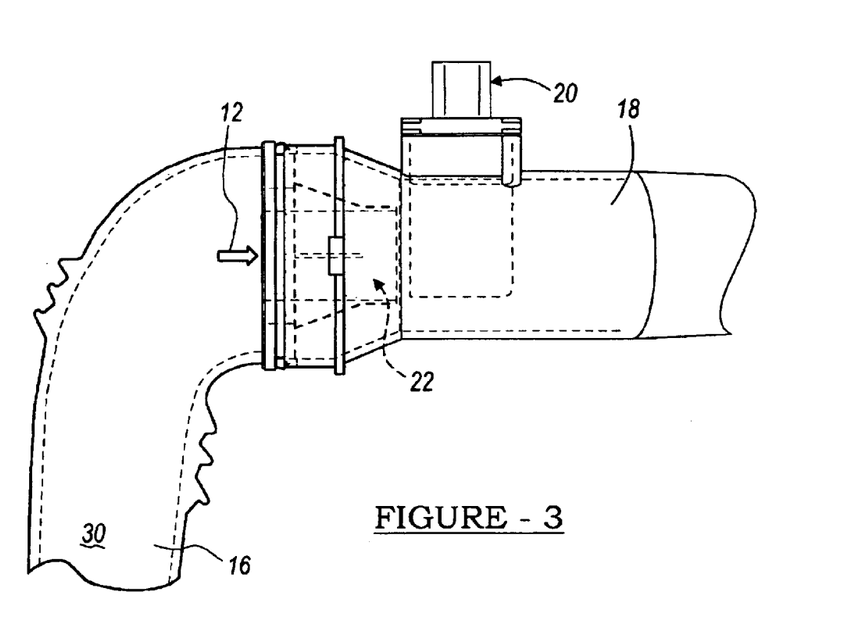
FIG. 3 is a perspective side view of FIG. 2.
Figure 4:
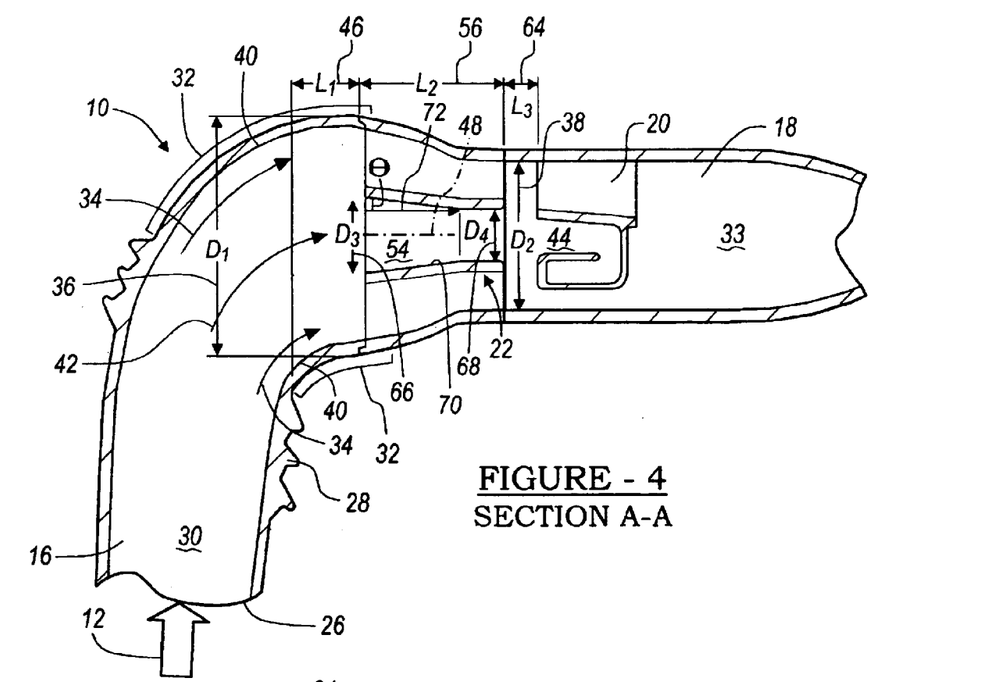
FIG. 4 is a cross-sectional view along lines A—A in FIG. 2 in accordance with the teachings of the present invention.

Referring in particular to FIGS. 2, 3, and 4 the clean air duct 16 at one end 26 is connected to the air filter 14 (not shown in FIG. 1) and the second end 28 is connected to the MAFS housing duct 18. The clean air duct 16 has a hollow interior passage 30 that facilitates the flow of the air from the air filter 14 to the MAFS housing duct 18. In order to accommodate the limited space available in the motor vehicle, the clean air duct 16 defines an air tight bend 32. The air flowing through the bend 32 in the MAFS housing duct 18, defines a curved air flow path such that the air is expanded in the area of the bend 32. Referring in particular to FIG. 4, the diameter of the MAFS housing duct 18 in the area of the bend 32 is $D_1$ and is shown by reference numeral 36. The clean air duct 10 may be formed of any material such as plastic, metal, or composites and by any process known for manufacturing duct from such materials.

With continued reference to FIGS. 2, 3 and 4, the MAFS housing duct 18 attached to the second end 28 of the clean air duct 16 functions to house the mass air flow sensor (MAFS) 20. The MAFS housing duct 18 defines an exterior surface 31 and an interior hollow passage 33 to allow air to flow through it. The MAFS housing duct 18 preferably has a reducing cross-section downstream from the bend 32 such that the diameter is $D_2$ represented by reference numeral 38 Since the cross section of MAFS housing duct 18 reduces in the direction of the air flow 12, the air accelerates as it passes through the MAFS housing duct 18.

The air flowing through the bend 32 may result in adverse pressure gradient due to the air encountering the interior wall 40 of the passage 30 in the clean air duct 16. Due to the air encountering the interior wall 40, the air shown by arrows 34 near the walls 40 of the clean air duct 16 is more turbulent than the air shown by arrow 42 around the center of the clean air duct 16. Turbulence is also caused due to inconsistent air flow 12 due to surface imperfections in the clean air duct 16 or the MAFS housing duct 18. As will be explained later, the flow conditioning device 22 will prevent the air 34 near the walls 40 of the clean air duct 16 to flow into the mass air flow sensor 20.

With continued reference to FIGS. 2, 3 and 4, in order to measure the amount of air inducted into the engine, the air inductions system 10 includes a Mass Air Flow Sensor (MAFS) 20. The MAFS 20 is located downstream from the clean air duct 16 and upstream from the throttle body 24 directly in the path of the air flow 12. As mentioned above the MAFS 20 is housed inside the MAFS housing duct 18. Air enters MAFS 20 through a MAFS entrance 44 provided in MAFS 20. In order to convert the amount of air drawn into the engine 11 into a voltage signal, MAFS 20 is also provided with a sensor (not shown). The air passes from the MAFS entrance 44 to the sensor, where the exact amount of air is measured by the sensor. The MAFS entrance 44 is located downstream in the direction of air flow path 12 and is positioned directly behind the flow conditioning device 22. Therefore, the air exiting the flow conditioning device 22 directly enters the MAFS entrance 44 and is measured by the sensor provided in the MAFS 20.

Referring in particular to FIGS. 2, 3, 4, 6 and 7, in order to regulate the flow of the air before the air enters the MAFS opening 44, the air induction system 10 is provided with a means for conditioning the flow such as a flow conditioning device 22. As shown in figures, the flow conditioning device 22 is preferably inserted inside the MAFS housing duct 18 and is disposed in the center of MAFS housing duct 18. Alternatively, it may be positioned between the clean air duct 16 and the MAFS housing duct 18. The flow conditioning device 22 is located in the air flow path 12 upstream from the MAFS entrance 44 but downstream from the bend 32 in the MAFS housing duct 18. Preferably, the flow conditioning device 22 is located at a distance $L_1$ (represented by reference numeral 46) from the bend 32. This distance $L_1$ can vary depending on the packaging of air induction system 10 inside the motor vehicle.

The flow conditioning device 22 preferably has a longitudinally extending body, extending longitudinally towards the MAFS opening 40. Alternatively, it may have a circular or a conical body. The flow conditioning device 22 defines a longitudinal axis 48 that is parallel to the air flow 12. The flow conditioning device 22 has an external surface 50 and an interior surface 52. The internal surface 52 has an air flow passageway 54 (as shown in FIG. 4) for allowing air to flow through the flow conditioning device 22. The length of the flow conditioning device $L_2$ is represented by reference numeral 56. Preferably the $L_2$ of the flow conditioning device 22 is such that the air passing through the flow conditioning device 22 is streamlined before the air enters the MAFS entrance 44.

Figure 6:
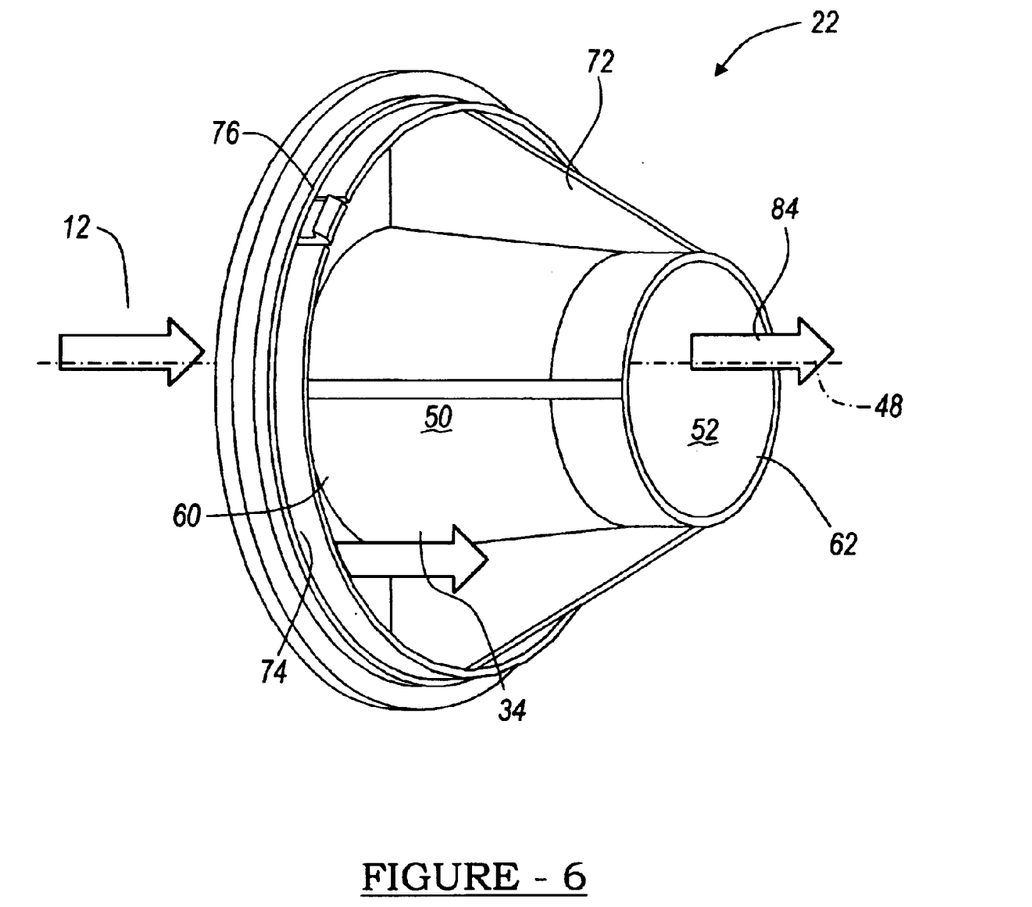
FIG. 6 is a perspective side view of the flow conditioning device.

With particular reference to FIGS. 3 and 6, the flow conditioning device 22 has an inlet 60 and an outlet 62. The air enters the flow conditioning device 22 from the MAFS housing duct 18 through the inlet 60 and exits the flow conditioning device 22 through the outlet 62 to the MAFS opening 40. The outlet 62 of the flow conditioning device 22 is positioned at distance $L_3$ (as shown by reference number 64) from the MAFS entrance 44. Preferably, the diameter $D_3$, 66, at the inlet 60 is greater than the diameter $D_4$ 68, at the outlet 62 such that air accelerates as it passes through the length $L_2$ of the flow conditioning device 22.

In order to assist the flow of air towards the reduced diameter 68 near the outlet 62, internal wall 70 at the interior surface 52 slope such that near the outlet 62, a portion of the walls 70 are substantially parallel to the air flow 12. Preferably, near the outlet 62, flow conditioning device 22 has a constant area section such that the air flow to the MAFS entrance 44 is substantially at a zero angle. Alternatively, the air flow to the MAFS entrance 44 may be at an inclined angle. Near the inlet 60, the walls 70 are preferably at an angle ø with respect to the longitudinal axis 48. Preferably, the angle between the wall 70 and the axis 48 is in the range of 0° to 10°. Therefore, as the air flows from the inlet 60 to the outlet 62 it accelerates before entering the MAFS entrance 44. Therefore, near the inlet 60, the interior surface 52 is conical and near the outlet 62, the interior surface 52 is cylindrical.

Figure 8:
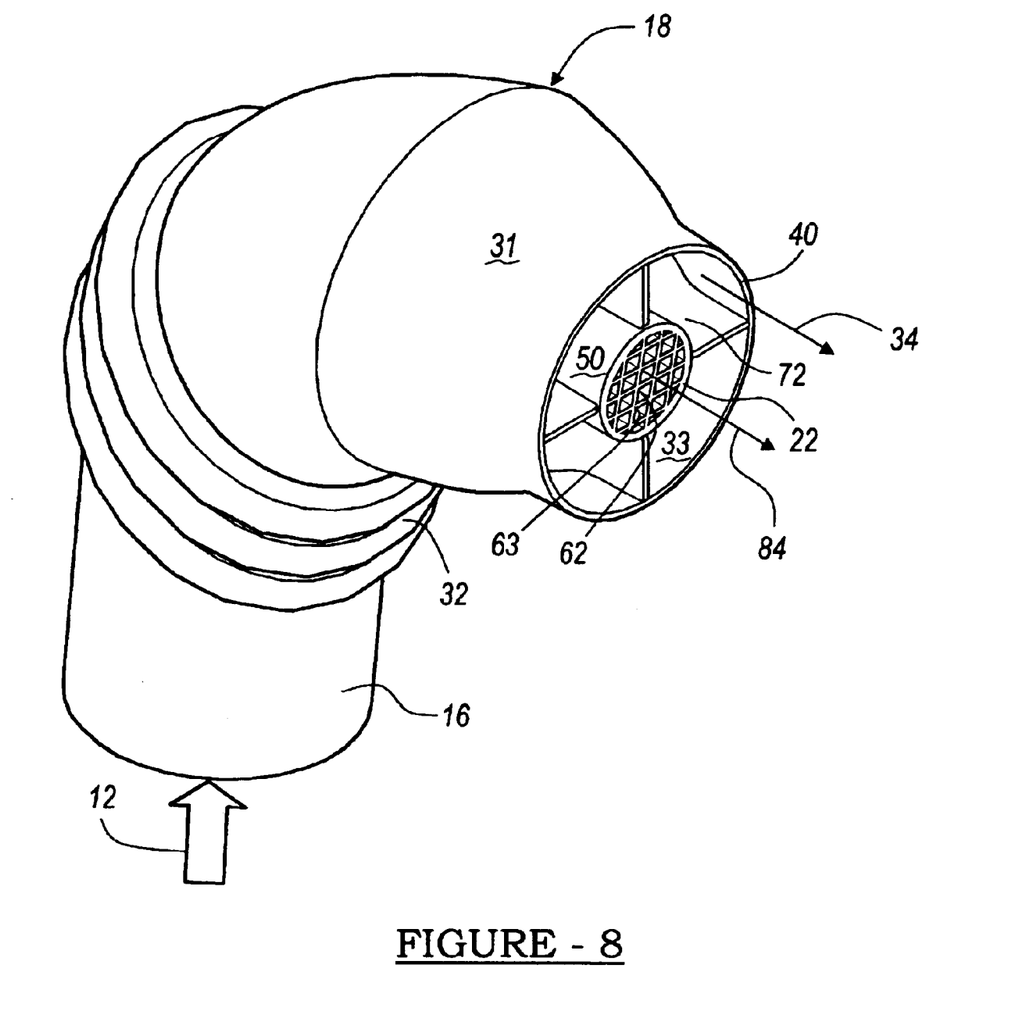
FIG. 8 is a perspective end view of the flow conditioning device with a grid structure at the outlet, in accordance with the teachings of the present invention.

Referring in particular to FIG. 8, an alternate embodiment of the air conditioning device 22 is shown. The flow conditioning device 22 in this embodiment is identical to the first embodiment, except a grid like structure 63 is attached at the outlet 62. The grid like structure 63 is preferably molded into the flow conditioning device 22. Alternatively, other attachment means such as screws, and bolts may be used to attach the grid like structure 63 to the flow conditioning device 22.

Figure 7:
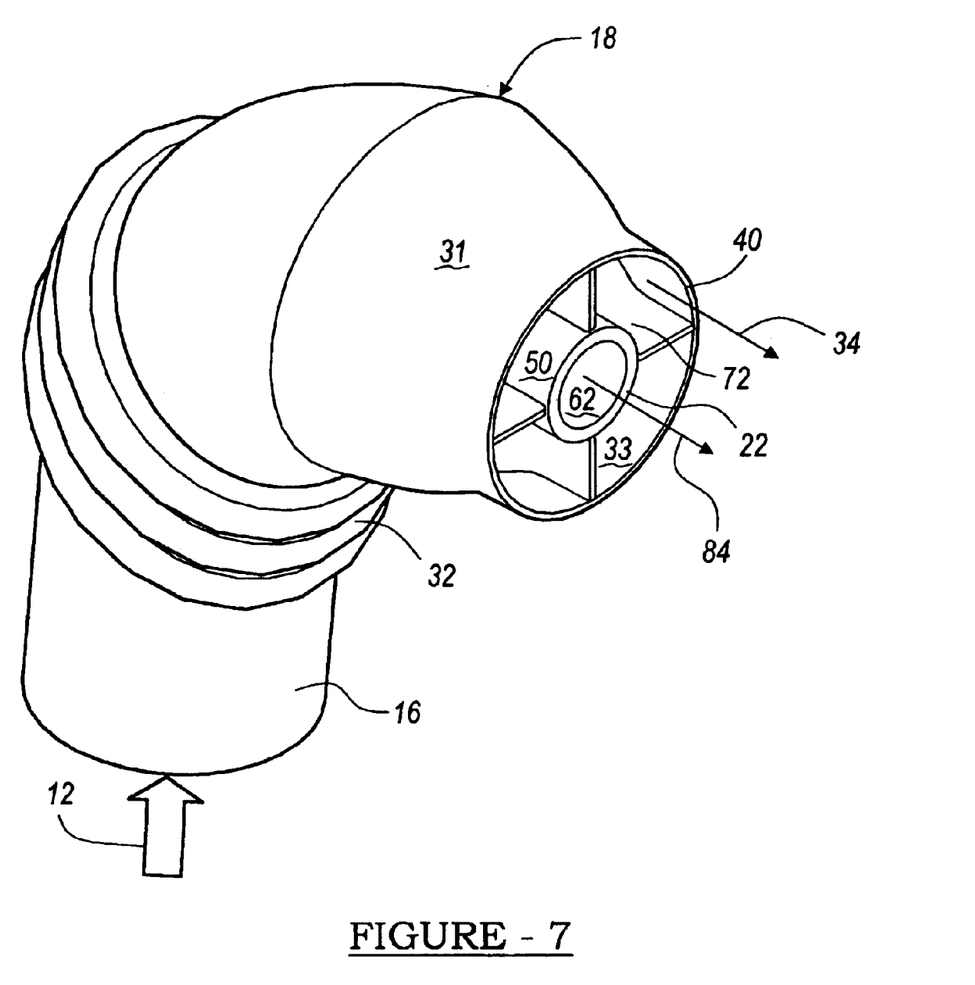
FIG. 7 is a perspective end view of the flow conditioning device as attached to the housing duct in accordance with the teachings of the present invention.

With reference to FIGS. 6 and 7, in order to mount the flow conditioning device 22 to the MAFS housing duct 18, the external surface 50 of the flow conditioning device 22 is provided with at least one rib 72. The rib 72 extends outward towards the walls 40 of the MAFS housing duct 18. Although not shown in the drawings, the inner surface of the MAFS housing duct 18 is provided with corresponding recess to receive the ribs 72. The inlet 60 of the flow conditioning device 22 preferably has an outwardly extending rim 74 that fits around the MAFS housing duct 18. Preferably, the rim 74 is provided with a plurality of locking devices 76 such that the flow conditioning device 22 can be securely locked to the MAFS housing duct 18.

Figure 5:
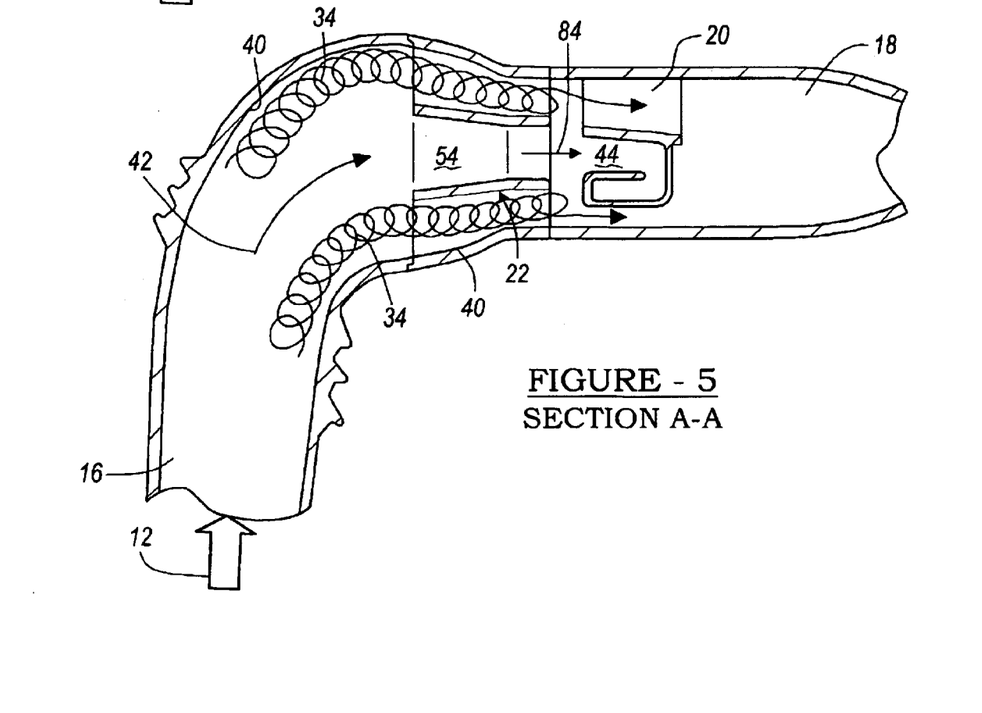
FIG. 5 is a cross-sectional view along lines A—A in FIG. 2, representing the air flow inside the air induction system in accordance with the teachings of the present invention.

Referring in particular to FIG. 5, the flow of air through various components in the air induction system is shown in details. As shown, the air flow from the air filter 14 to the clean air duct 16 is generally shown by reference numeral 12. As explained above, as air passes through the bend 32 in clean air duct 16, the air may become turbulent near the walls 40 of the passage 30. As described above, the turbulent air near the walls 40 of the clean air duct 16 is represented by reference numeral 34. The less turbulent air around the center of clean air duct 16 is represented by reference numeral 42. As explained above, the flow conditioning device 22 is oriented around the center of MAFS housing duct 18. Therefore, only the air 42 around the center of clean air duct 18 enters through the inlet 60 of the flow conditioning device 22. Since the MAFS entrance 44 is aligned with the outlet 62 of the flow conditioning device 22, only the air exiting the outlet 62 shown by reference numeral 84 enters the MAFS entrance 44. As seen in the drawing the turbulent air 34 passes through the outside surface 50 of the flow conditioning device 22, thereby bypassing the MAFS entrance 44. Since the flow conditioning device 22 prevents the turbulent air 34 from entering the MAFS entrance 44, there is substantial improvement in the noise to signal output measured by MAFS 20.

As seen from the above, since the flow conditioning device 22 can be manufactured separate from the other components in air induction system 10, it allows flexibility in the positioning and the dimensions in manufacturing of the flow conditioning device 22. For example, depending on the packaging of the air induction system 10, the distance $L_1$ can be either increased or decreased. Additionally, the length and the distance from MAFS 20 can be also changed.

As any person skilled in the art will recognize from the previous description and from the figures and claims, modifications and changes can be made to the preferred embodiment of the invention without departing from the scope of the invention as defined in the following claims.

What is claimed is:

1. An air induction system for transporting ambient air into an engine of an automobile, the system comprising:
   an air filter for removing debris from the ambient air;
   a duct in communication with the air filter, wherein the duct defines an air passage for carrying the ambient air.
   a flow conditioning device positioned downstream from the air filter, the flow conditioning device having a longitudinally extending body, wherein the longitudinally extending body has an exterior surface and an interior surface and wherein the interior surface defines an air flow passageway, the air flow passageway having a conical first portion for allowing air to enter the flow conditioning device and a cylindrical second portion to allow the air to exit the flow conditioning device, thereby conditioning the air passing through; and
   a sensor mounted to the duct, wherein the sensor is disposed downstream from the flow conditioning device, wherein the sensor is positioned to receive the conditioned air.

2. The system of claim 1, wherein the flow conditioning device is positioned approximately at a center of the duct such that the air in the center of the duct enters the air flow passageway of the flow conditioning device and the air proximate an interior wall at the duct bypasses the air flow passageway.

3. The system of claim 1, wherein the cylindrical second portion is positioned proximate to the sensor such that the air exiting the flow conditioning device enters the sensor.

4. The system of claim 1, wherein the cylindrical second portion further includes a grid like structure to further condition air flow before entering the sensor.

5. The system of claim 1, wherein a portion of an interior surface of the conical first portion of the passageway is inclined at a predefined angle with respect to the air flow.

6. The system of claim 5, wherein the pre-defined angle is between about 0 and 10 degrees.

7. The system of claim 1, wherein a portion of an interior surface of the cylindrical second portion of the passageway is substantially parallel to the air flow.

8. The system of claim 1, wherein a diameter of an inlet of the conical first portion is greater than the diameter of the exit of the cylindrical second portion such that air accelerates as it passes through the air flow passageway.

9. A flow conditioning device installed in an air induction system for transporting ambient air into an engine of an automobile, the air induction system including an air filter for removing debris from the ambient air, a duct in communication with the air filter, wherein the duct defines an air passage for carrying the ambient air and a sensor to measure the amount of air inducted into the engine, the device comprising:
   a longitudinally extending body mounted in the duct, wherein the longitudinally extending body is disposed downstream from the air filter and upstream from the sensor, wherein the longitudinally extending body has an exterior surface and an interior surface, such that the interior surface defines an air flow passageway, the passageway having a conical first portion for allowing air to enter the longitudinally extending body and a cylindrical second portion to allow the air to exit the longitudinally extending body.

10. The system of claim 9, wherein the longitudinally extending body is positioned approximately at a center of the duct such that the air in the center of the duct enters the air flow passageway and the air proximate the interior wall of the duct bypasses the air flow passageway.

11. The system of claim 9, wherein the longitudinally extending body is mounted to the duct by at least one rib extending radially away from the exterior surface of the longitudinally extending body.

12. The system of claim 9, wherein the cylindrical second portion is positioned proximate to the sensor such that the air exiting the longitudinally extending body enters the sensor.

13. The system of claim 9, wherein the cylindrical second portion further includes a grid like structure to further condition the air flow before entering the sensor.

14. The system of claim 9, wherein a portion of an interior surface of the conical first portion is inclined at a predefined angle with respect to the air flow.

15. The system of claim 14, wherein the pre-defined angle is between about 0 and 10 degrees.

16. The system of claim 9, wherein a portion of an interior surface of the cylindrical second portion is substantially parallel to the air flow.

17. The system of claim 9, wherein diameter of an inlet of the conical first portion is greater than the diameter of an exit of the cylindrical second portion such that air accelerates as it passes through the air passageway.

18. An air induction system installed in a vicinity of an engine for transporting air from the outside to the engine in an automobile, wherein the air flowing from the outside to the engine defines an air flow path, the system comprising:
   an air filter for cleaning the air drawn from the outside;
   a clean air duct wherein one end of the duct is connected to the air filter, the duct defines an exterior surface and an interior surface, wherein the interior surface allows air to flow to the engine, wherein the air is more turbulent proximate an interior wall of the interior surface than at the center of the interior surface of the duct;
   a housing duct connected to a second end of the clean air duct.
   a means for conditioning air flow wherein the means is positioned upstream from the sensing device and downstream from the air filter, the means having a longitudinally extending body, wherein the longitudinally extending body has an exterior surface and an interior surface and wherein the interior surface defines an air flow passageway, the air flow passageway having a conical first portion for allowing air to enter the means for conditioning air flow and a cylindrical second portion to allow the air to exit the means for conditioning air flow, thereby conditioning the air passing there through; and a sensing device with an opening mounted to the housing duct wherein the sensing device is disposed downstream from the means for conditioning air flow, wherein the opening receives the conditioned air.

19. The system of claim 18, wherein the longitudinally extending body is attached to the housing duct by at least one rib, wherein the at least one rib extends radially away from the external surface of the longitudinally extending body.

20. The system of claim 18, wherein the cylindrical second portion is positioned proximate to the sensor such that the air exiting the means for conditioning air flow enters the sensor.

21. The system of claim 18, wherein the cylindrical second portion further includes a grid like structure to further condition air flow before entering the sensor.

22. The system of claim 18, wherein a portion of an interior surface of the conical first portion of the passageway is inclined at a predefined angle with respect to the air flow.

23. The system of claim 22, wherein the pre-defined angle is between about 0 and 10 degrees.

24. The system of claim 18, wherein a portion of an interior surface of the cylindrical second portion of the passageway is substantially parallel to the air flow.

25. The system of claim 18, wherein a diameter of an inlet of the conical first portion is greater than the diameter of the exit of the cylindrical second portion such that air accelerates as it passes through the air flow passageway.

26. An air induction system for transporting ambient air into an engine of an automobile, the system comprising:

an air filter for removing debris from the ambient air;

a duct in communication with the air filter, the duct defining an air passage for carrying the ambient air and further including a clean air portion and a sensor housing portion disposed in the sensor housing portion;

a flow conditioning device positioned downstream from the air filter, the flow conditioning device having a longitudinally extending body, the longitudinally extending body having an exterior surface and an interior surface, the interior surface defining an air flow passageway, the longitudinally extending body being attached to the sensor housing portion by at least one rib, the at least one rib extending radially away from the external surface of the longitudinally extending body, thereby conditioning the air passing through; and a sensor mounted to the duct and being disposed downstream from the flow conditioning device, the sensor being positioned to receive the conditioned air.

* * * * *

UNITED STATES PATENT AND TRADEMARK OFFICE
CERTIFICATE OF CORRECTION

PATENT NO. : 6,899,081 B2
DATED : May 31, 2005
INVENTOR(S) : Jim Bielicki et al.

It is certified that error appears in the above-identified patent and that said Letters Patent is hereby corrected as shown below:

Column 5,
Line 23, delete "air." and substitute -- air; --.

Column 6,
Line 55, delete "duct." and substitute -- duct, --.

Signed and Sealed this

Third Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,899,081 B2
APPLICATION NO. : 10/251582
DATED : May 31, 2005
INVENTOR(S) : Jim Bielicki et al.

It is certified that error appears in the above-identified patent and that said Letters Patent is hereby corrected as shown below:

In column 6, line 54, delete "duct." and substitute --duct,-- in its place.

Signed and Sealed this

Fourth Day of July, 2006

JON W. DUDAS
*Director of the United States Patent and Trademark Office*